H. L. STULL.
BOILER PATCH.
APPLICATION FILED JAN. 28, 1913.

1,096,070.

Patented May 12, 1914.

Witnesses
Arthur K. Moore
J. H. McFeet

Inventor
H. L. Stull
By Chandler & Chandler
Attorneys.

UNITED STATES PATENT OFFICE.

HENRY L. STULL, OF GIRARD, OHIO.

BOILER-PATCH.

1,096,070.  Specification of Letters Patent.  Patented May 12, 1914.

Application filed January 28, 1913. Serial No. 744,710.

*To all whom it may concern:*

Be it known that I, HENRY L. STULL, a citizen of the United States, residing at Girard, in the county of Trumbull, State of Ohio, have invented certain new and useful Improvements in Boiler-Patches; and I do hereby declare the following to be a full, clear, and exact description of the invention, such as will enable others skilled in the art to which it appertains to make and use the same.

This invention relates to improvements in boiler patches and strengthening devices.

The principal object of the invention is to provide a simple device of this character wherein a patch may be quickly and securely applied to a leaking portion of a boiler.

Other objects and advantages will be apparent from the following description when taken in connection with the accompanying drawings.

Figure 1:
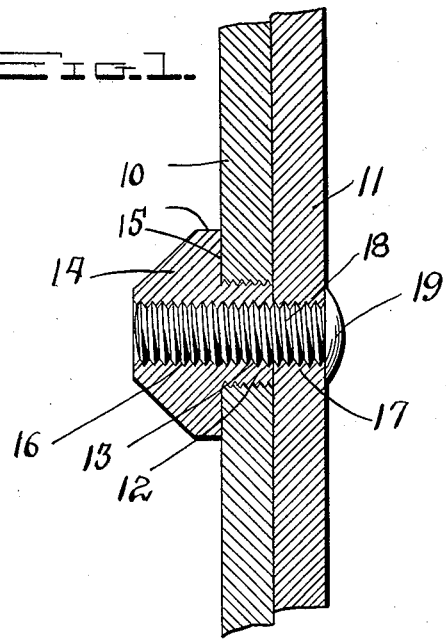

In the drawings: Figure 1 is a section through a boiler plate and patch, showing my invention applied thereto, and in connection with an ordinary stay bolt, Fig. 2 is a view from within the boiler, Fig. 3 is a section similar to Fig. 1, showing a specially constructed bolt, and Fig. 4 is a view from without the boiler.

Figure 2:
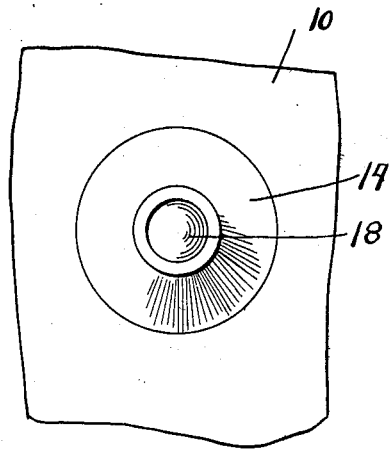
Figure 3:
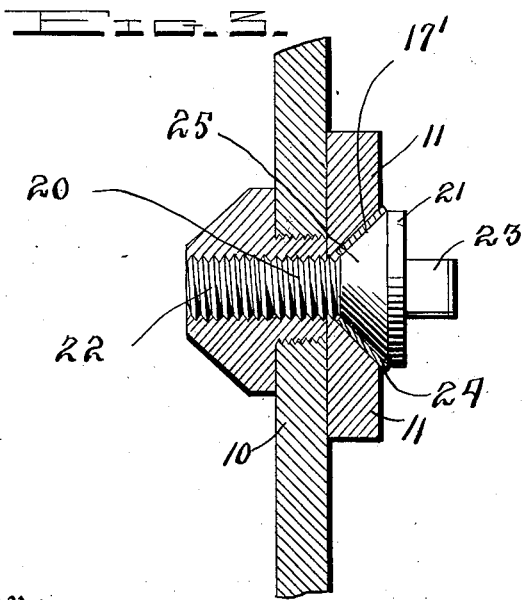

Referring particularly to the drawings, especially to Figs. 1 and 2, 10 represents the boiler plate, 11 the patch plate. Formed in the boiler plate where it is intended to place the patch is a threaded opening 12 and screwed into the opening is a threaded extension 13 of a thimble 14. This thimble has a shoulder 15 which bears against the inner face of the plate 10, and is provided with a central bore 16, this bore being formed with right hand threads. The threads of the extension 13 are left hand threads. The patch plate 11 is formed with an opening 17 through which the ordinary stay bolt 18 is passed, the threaded end of said bolt being screwed into the threaded bore of the thimble 14, the outer end 19 of the bolt being cut off, after it is screwed in the proper distance, and the end mashed down, in a form, similar to a rivet head.

Figure 4:
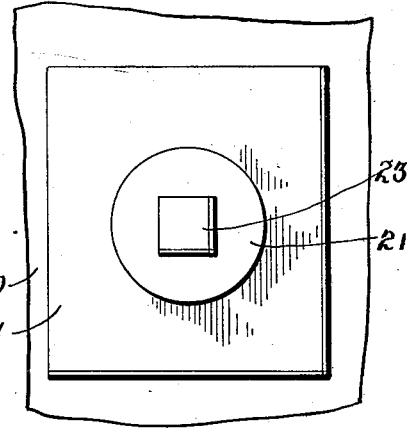

In the form as shown in Figs. 2 and 4, the parts 10, 11, 12, 13, 14, 15 and 16 are the same as those in the first form, but the bolt 20 is somewhat different. This bolt 20 is provided with a flanged disk 21 between the threaded portions 22 and the wrench engaging head 23, this disk 21 bearing against the washer 24, which bears against the outer face of the patch plate 11. The threaded portion 22 of this bolt 20 is screwed into the central bore 16, of the thimble 14. It will be noted that the patch plate in the forms in Figs. 3 and 4 is provided with a countersunk opening 17', in which the tapered portion 25 of the bolt 20 is seated.

What is claimed is:

In a repair device for boilers, a boiler plate having an opening provided with left hand threads, a thimble having an extension provided with left hand threads for engagement in the threaded opening of the boiler plate, said thimble having a longitudinal bore provided with right hand threads, a patch having an inwardly tapering countersunk opening arranged in registery with the bore of the thimble, a bolt provided with right hand threads for engagement through the hole of the patch plate and into the threaded bore of the thimble, a conical washer on the bolt and disposed in the countersunk opening of the patch plate, and a tapered shoulder on the bolt fitting into the conical washer.

In testimony whereof, I affix my signature, in the presence of two witnesses.

HENRY L. STULL.

Witnesses:
  CHARLES SECHLER,
  GEORGE JOB.